(12) United States Patent
Poppen et al.

(10) Patent No.: US 9,778,059 B2
(45) Date of Patent: Oct. 3, 2017

(54) POINT OF INTEREST SEARCH ALONG A ROUTE

(71) Applicant: Uber Technologies, Inc., San Francisco, CA (US)

(72) Inventors: Richard F. Poppen, San Jose, CA (US); Weidong Tang, Daillian (CN); Daniel R. Brownstone, New York, NY (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 0 days.

(21) Appl. No.: 15/082,849

(22) Filed: Mar. 28, 2016

(65) Prior Publication Data
US 2016/0209229 A1 Jul. 21, 2016

Related U.S. Application Data

(63) Continuation of application No. 12/936,128, filed as application No. PCT/CN2009/071127 on Apr. 1, 2009, now Pat. No. 9,304,008.

(Continued)

(51) Int. Cl.
G01C 21/34 (2006.01)
G01C 21/36 (2006.01)
G01S 19/42 (2010.01)

(52) U.S. Cl.
CPC ..... *G01C 21/3626* (2013.01); *G01C 21/3476* (2013.01); *G01C 21/3617* (2013.01); *G01C 21/3679* (2013.01); *G01S 19/42* (2013.01)

(58) Field of Classification Search
CPC .... C01C 1/00; G01C 21/3476; G01C 21/3617

(Continued)

(56) References Cited

U.S. PATENT DOCUMENTS 5,893,081 A 4/1999 Poppen
5,963,956 A 10/1999 Smartt
(Continued)

FOREIGN PATENT DOCUMENTS

CN 1550755 12/2004
CN 1828228 9/2006
(Continued)

OTHER PUBLICATIONS

PCT International Search Report and Written Opinion, PCT/CN2009/071127, dated Jul. 9, 2009, 10 pages.

(Continued)

*Primary Examiner* — Yazan Soofi
(74) *Attorney, Agent, or Firm* — Fenwick & West LLP

(57) ABSTRACT

A system includes a GPS module, user interface module, database and routing engine. To find nearby POIs in one embodiment the routing engine identifies POIs in the database located within a threshold distance from the planned route in Euclidean distance. The routing engine filters the results by exploring the road network to determine whether each of the POIs is within the threshold distance of the route in driving distance. The filtering may include exploring outward from the POI, until all roads within the threshold distance are explored or the route is reached; alternatively, distance to the POIs is checked by exploring outward from the route until all roads within the threshold distance of the route have been exposed. For those POIs reached in the exploration, the nearest point on the route and the distance to that point are known. Similar searches are performed based on driving time rather than distance.

15 Claims, 5 Drawing Sheets

Related U.S. Application Data

(60) Provisional application No. 61/041,496, filed on Apr. 1, 2008.

(58) Field of Classification Search
USPC .......................................................... 701/201
See application file for complete search history.

(56) References Cited

U.S. PATENT DOCUMENTS

| | | | |
|---|---|---|---|
| 5,978,730 | A | 11/1999 | Poppen et al. |
| 6,038,509 | A | 3/2000 | Poppen et al. |
| 6,377,887 | B1 | 4/2002 | Poppen et al. |
| 6,377,889 | B1 | 4/2002 | Soest |
| 6,401,034 | B1 | 6/2002 | Kaplan et al. |
| 6,507,291 | B1 | 1/2003 | Schreiner |
| 6,587,782 | B1 | 7/2003 | Nocek et al. |
| 6,859,724 | B2 | 2/2005 | Komatsu |
| 7,565,239 | B2 | 7/2009 | de Silva et al. |
| 7,698,062 | B1 * | 4/2010 | McMullen ............. G01C 21/20 342/357.31 |
| 8,095,303 | B1 * | 1/2012 | Nesbitt ............. G01C 21/3476 340/988 |
| 8,243,060 | B2 | 8/2012 | Stitt et al. |
| 8,260,549 | B2 | 9/2012 | Poppen |
| 8,401,786 | B2 | 3/2013 | Poppen et al. |
| 8,467,960 | B2 | 6/2013 | Rinscheid |
| 8,630,791 | B2 | 1/2014 | Yuasa |
| 8,781,729 | B2 | 7/2014 | Nesbitt et al. |
| 8,892,350 | B2 | 11/2014 | Weir et al. |
| 2001/0004725 | A1 | 6/2001 | Yagyu |
| 2002/0047787 | A1 | 4/2002 | Mikkola et al. |
| 2002/0130906 | A1 | 9/2002 | Miyaki |
| 2002/0133292 | A1 | 9/2002 | Miyaki |
| 2003/0028320 | A1 | 2/2003 | Niitsuma |
| 2003/0036848 | A1 | 2/2003 | Sheha et al. |
| 2003/0125870 | A1 | 7/2003 | Woestemeyer et al. |
| 2003/0216860 | A1 | 11/2003 | Shitamatsu et al. |
| 2004/0083055 | A1 | 4/2004 | Hirose et al. |
| 2004/0102899 | A1 | 5/2004 | Kaji et al. |
| 2004/0143387 | A1 | 7/2004 | Shimizu et al. |
| 2004/0172193 | A1 | 9/2004 | Monde et al. |
| 2004/0215388 | A1 | 10/2004 | Takenaka |
| 2004/0260465 | A1 * | 12/2004 | Tu ..................... G01C 21/3679 701/426 |
| 2005/0107949 | A1 | 5/2005 | Yokota |
| 2005/0171686 | A1 | 8/2005 | Davis |
| 2005/0216191 | A1 | 9/2005 | Sumizawa et al. |
| 2005/0251327 | A1 | 11/2005 | Ogasawara et al. |
| 2006/0106534 | A1 | 5/2006 | Kawamata et al. |
| 2006/0116815 | A1 | 6/2006 | Nomura |
| 2007/0005235 | A1 | 1/2007 | Suzuki et al. |
| 2007/0005242 | A1 | 1/2007 | Kato et al. |
| 2007/0010942 | A1 | 1/2007 | Bill |
| 2007/0032947 | A1 | 2/2007 | Yamada et al. |
| 2007/0156334 | A1 * | 7/2007 | Vu ..................... G01C 21/3415 701/416 |
| 2007/0203638 | A1 | 8/2007 | Tooyama et al. |
| 2007/0225910 | A1 | 9/2007 | Fujiwara |
| 2008/0027639 | A1 | 1/2008 | Tryon |
| 2008/0051995 | A1 | 2/2008 | Lokshin et al. |
| 2008/0071471 | A1 | 3/2008 | Sumizawa et al. |
| 2008/0177463 | A1 | 7/2008 | Hamaguchi |
| 2008/0177465 | A1 | 7/2008 | Barber et al. |
| 2008/0270014 | A1 | 10/2008 | Nagase et al. |
| 2009/0018766 | A1 | 1/2009 | Chen et al. |
| 2009/0037101 | A1 | 2/2009 | Koike et al. |
| 2009/0082953 | A1 | 3/2009 | Shimizu |
| 2009/0088964 | A1 | 4/2009 | Schaaf et al. |
| 2009/0171561 | A1 | 7/2009 | Geelen |
| 2009/0192705 | A1 | 7/2009 | Golding et al. |
| 2009/0216732 | A1 | 8/2009 | Feng |
| 2009/0234577 | A1 | 9/2009 | Rinscheid |
| 2009/0281716 | A1 | 11/2009 | Jung et al. |
| 2009/0319177 | A1 | 12/2009 | Khosravy et al. |
| 2010/0088018 | A1 | 4/2010 | Tsurutome et al. |
| 2010/0152997 | A1 | 6/2010 | de Silva et al. |
| 2010/0251088 | A1 | 9/2010 | Rasmussen et al. |
| 2012/0046819 | A1 | 2/2012 | Agrawal et al. |

FOREIGN PATENT DOCUMENTS

| | | |
|---|---|---|
| CN | 1906463 | 1/2007 |
| CN | 101000371 | 7/2007 |
| EP | 1376059 | 1/2004 |
| EP | 1936519 | 6/2008 |
| JP | 2004-257966 | 9/2004 |
| JP | 2006-170950 | 6/2006 |
| JP | 2007-024624 | 2/2007 |
| JP | 2007-40721 | 2/2007 |
| JP | 2007-218770 | 8/2007 |
| WO | WO 2007/037281 | 4/2007 |
| WO | WO 2008/083749 | 7/2008 |
| WO | WO 2010/111833 | 10/2010 |

OTHER PUBLICATIONS

PCT International Search Report and Written Opinion, PCT Application No. PCT/CN2009/071126, dated Jan. 7, 2010, 9 pages.
Australian Examination Report, Australian Application No. 2009231001, dated Apr. 3, 2013, 4 pages.
Chinese Office Action, Chinese Application No. 200980118512.5, dated Aug. 29, 2012, 21 pages.
European Extended Search Report, European Application No. 09726607.6, dated Nov. 7, 2012, 9 pages.
Australian Office Action, Australian Application No. 2009343389, dated Jan. 24, 2014, 3 pages.
Chinese Second Office Action, Chinese Application No. 200980118512.5, dated Nov. 29, 2013, 19 pages.
Chinese First Office Action, Chinese Application No. 200980159608.6, Dec. 3, 2013, 8 pages.
Australian Second Examination Report, Australian Application No. 2009343389, dated Aug. 29, 2014, 3 pages.
Chinese Second Office Action, Chinese Application No. 200980159608.6, dated May 19, 2014, 13 pages.
Chinese Second Office Action, Chinese Application No. 200980118512.5, dated Aug. 28, 2014, 23 pages.
European Examination Report, European Application No. 09726607.6, Apr. 3, 2014, 5 pages.
European Extended Search Report, European Application No. 09842490.6, dated Apr. 7, 2014. 5 pages.
Australian Third Examination Report, Australian Application No. 2009343389, dated Feb. 3, 2015, 3 pages.
Australian Fourth Examination Report, Australian Application No. 2009343389, dated Apr. 23, 2015, 3 pages.
Chinese Third Office Action, Chinese Application No. 200980159608.6, dated Jan. 19, 2015, 13 pages.
European Second Examination Report, European Application No. 09726607.6, dated Dec. 4, 2014, 7 pages.
Korean Office Action, Korean Application No. 10-2011-7025842, May 15, 2015, 10 pages.
Canadian Office Action, Canadian Application No. 2,757,148, dated Oct. 21, 2015, 5 pages.
Canadian Office Action, Canadian Application No. 2,719,702, dated Oct. 21, 2015, 4 pages.
Chinese Fourth Office Action, Chinese Application No. 200980159608.6, dated Sep. 30, 2015, 4 pages.
United States Office Action, U.S. Appl. No. 12/936,128, dated Mar. 2, 2015, 30 pages.
United States Office Action, U.S. Appl. No. 12/936,128, dated Jun. 16, 2014, 30 pages.
United States Office Action, U.S. Appl. No. 12/936,128, dated Oct. 1, 2013, 23 pages.
United States Office Action, U.S. Appl. No. 12/936,128, dated Jan. 16, 2013, 36 pages.
European Examination Report, European Application No. 09842490.6, dated May 3, 2016, 4 pages.

(56) References Cited

OTHER PUBLICATIONS

AU First Examination Report, Australian Application No. 2014280972, dated May 23, 2016, 2 pages.
Korean Office Action, Korean Application No. 10-2011-7025842, dated Mar. 3, 2016, 10 pages.
European Summons to Attend Oral Proceedings Pursuant to Rule 115(1) EPC, European Application No. 09726607.6, dated Feb. 15, 2016, 7 pages.
Korean Office Action, Korean Application No. 10-2011-7025842, dated Dec. 7, 2015, 4 pages. (with concise explanation of relevance).
United States Office Action, U.S. Appl. No. 13/748,065, Dec. 26, 2014, 11 pages.
United States Office Action, U.S. Appl. No. 13/748,065, Jul. 17, 2014, 11 pages.
United States Office Action, U.S. Appl. No. 13/748,065, dated Dec. 13, 2013, 11 pages.
United States Office Action, U.S. Appl. No. 13/748,065, dated Jun. 21, 2013, 9 pages.
Australian Second Examination Report, Australian Application No. 2014280972, dated Mar. 21, 2017, 3 pages.

\* cited by examiner

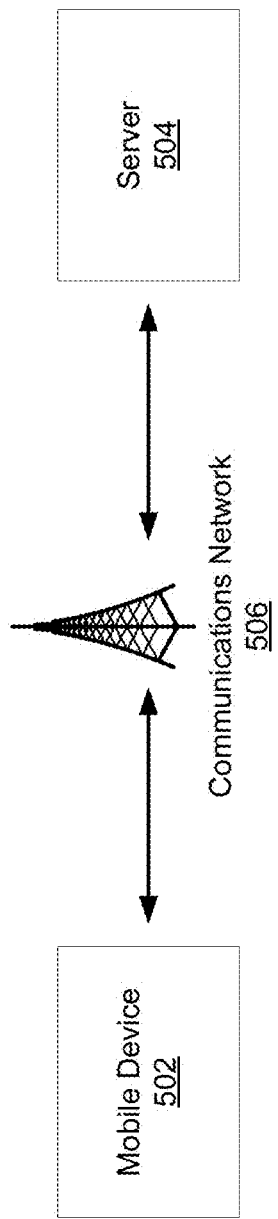

(12) United States Patent

POINT OF INTEREST SEARCH ALONG A ROUTE

CROSS-REFERENCE TO RELATED APPLICATIONS

This application is a continuation of U.S. Pat. No. 9,304, 008, which is a National Stage Entry of PCT Application PCT/CN2009/071127, filed on Apr. 1, 2009, which claims the benefit of U.S. Provisional Application 61/041,496, filed on Apr. 1, 2008. Each application is incorporated by reference herein in its entirety.

BACKGROUND

Field of the Invention

The present invention is directed to the use of navigation systems. In particular, the present invention enables better timing and routing information to be provided related to points of interest along a route.

Description of the Related Art

Navigation systems are popularly used to guide travelers to destinations. Such systems are available built into vehicles or free-standing, to be moved from vehicle to vehicle; for use by drivers and/or pedestrians; as purpose-built devices or as applications on general-purpose devices such as personal digital assistants or mobile telephones; and as systems that are entirely self-contained or as systems that utilize a remote server to perform some or all of their calculations. We refer generally to these systems as "navigation systems."

Since a common use of navigation systems is to guide the traveler to a desired destination, an important function of such systems is the selection of the destination. In some cases, the driver selects the destination by entering the address. In others, the driver selects the destination from a personal list of stored destinations, typically including home and work. In addition, the driver often wants to select a destination from a directory of "points of interest".

Points of interest ("POIs") include many kinds of destinations that drivers may want to find, either when running errands near home or when traveling away from home, such as hotels, restaurants, gas stations, stores of various kinds, roadside rest areas, and emergency services such as hospitals or police stations. The driver may want to search for any POI in a given category (e.g., any restaurant), or for a POI with a given name in a given category (e.g., a restaurant whose name contains "Taqueria"), or for a POI with a given name in any category (e.g., a POI whose name contains "Taqueria", without knowing whether the category should be "restaurant" or "fast food"). The driver may want to search for POIs radially around the current location, without regard to any previous or current destination. Alternatively, the driver may want to search for POIs near an already-computed route, for example, finding a gas station near the currently planned route to a destination. All of these kinds of search are commonly supported in modern navigation systems.

SUMMARY

The present invention enables searches for points of interest along a route. A driver may be looking more or less urgently for a POI, and may therefore be willing to travel a greater or lesser distance off the currently-planned route. A driver who suddenly notices a fuel gauge approaching "empty" may be willing to travel several miles off-route to find a gas station soon, while a driver who is just beginning to feel hungry may be willing to drive half an hour down the route to find a restaurant very close to the route. The present invention also enables searching for POIs along a current route, even when the route has not been pre-programmed by the driver.

A system in accordance with the present invention includes a GPS module, user interface module, database and routing engine. To find a list of nearby POIs, for example upon request by a driver, in one embodiment the routing engine identifies POIs in the database that are located within a threshold distance from the planned route in Euclidean distance. The routing engine then filters the results by exploring the road network to determine whether each of the POIs is within the threshold distance of the route in driving distance. The filtering may include exploring outward from the POI, e.g., using Dijkstra's algorithm, until either all roads within the threshold distance are explored or the route is reached; alternatively, distance to the POIs can be checked by exploring outward from the route until all roads within the threshold distance of the route have been exposed. For those POIs reached in the exploration, the nearest point on the route and the distance to that point are known. Similar searches are performed based on driving time rather than distance.

BRIEF DESCRIPTION OF THE DRAWINGS

FIG. 5 illustrates communication between a mobile device and a server in accordance with an embodiment of the present invention.

DETAILED DESCRIPTION OF THE PREFERRED EMBODIMENTS

Since navigation systems are commonly used by drivers of vehicles, we frequently refer to the user of such a system as "the driver". However, the description that follows is not intended to be limited only to vehicle drivers; it may be applied equally to any use in which the user of the system is any kind of traveler, including, for example, a pedestrian, a bicycle rider, or a person using multiple modes of transportation, such as walking and riding public transit vehicles. In addition, while described in the context of public roadways and highways, the described systems and methods may also be used for aircraft navigation and marine navigation.

Figure 1:
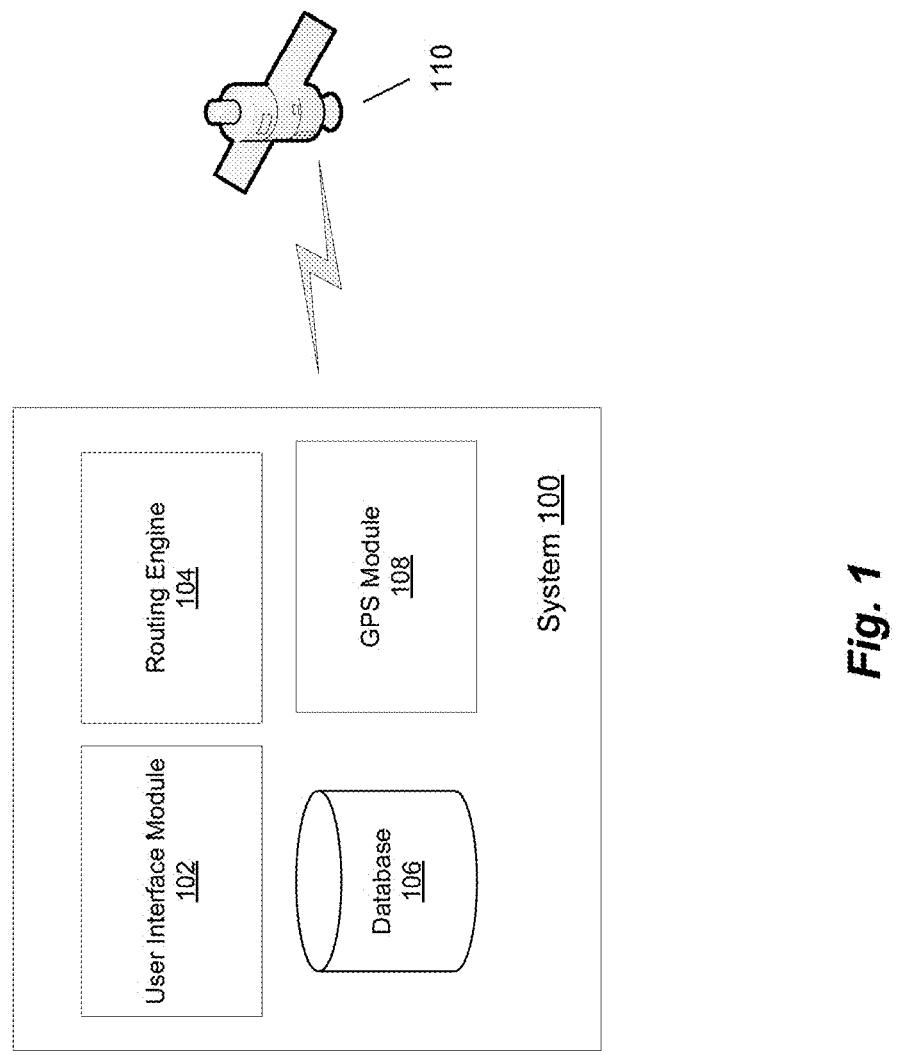
FIG. 1 is a block diagram of a navigation device in accordance with an embodiment of the present invention.

FIG. 1 is a diagram of a system 100 in accordance with an embodiment of the present invention. System 100 includes a user interface (UI) module 102, a routing engine 104, a database 106, and GPS module 108. UI module 102 provides one or more screens of information and enables the driver to communicate with the navigation system 100. Routing engine 104 manages route planning and guidance functions, including routing to POIs along a route as described below. Database 106 provides local storage for navigation system 100 and may include information about POIs and other features such as roads, intersections, terrain, and the like. GPS module 108 performs GPS location functions and receives GPS signals from GPS satellites 110. Note that although in the described embodiment navigation system 100 uses GPS to determine its location, alternative technology may be used, particularly as newer technology is developed. The present invention is equally applicable regardless of the manner in which system 100 derives its location.

User interface module 102 provides many of the user interface functions conventionally available on personal navigation devices. For example, UI module 102 allows a user to specify a destination by entering an address or selecting from a list. In addition, UI module 102 in various embodiments of the present invention includes interface elements for receiving POI search preferences from a driver, and for presenting POI search results and routing information, as described more fully below.

We begin with an example to illustrate the operation of system 100. In this example, a driver sets out on a lengthy road trip from San Francisco, Calif. to Alexandria, Va. Routing engine 104 plots the best route, taking into account any preferences selected by the driver—for example, avoiding toll roads. User interface module 102 displays the plotted route, and the driver sets out along Interstate 80 heading east.

After driving for several hours, the driver begins to get hungry. By referring to the user interface, the driver observes he has just passed through Mill City, Nev. The next major town along his route is Winnemucca, which is likely to have several restaurant options. Alternatively, the small town of Cosgrave, which has a single restaurant, is much closer. Cosgrave, however, is not along the interstate, and would require a deviation of some distance from the driver's planned route. While eating sooner would be a positive experience for the driver, it is also important to him to arrive in Salt Lake City, Utah before dark. He is unsure of the delay involved in deviating to the Cosgrave restaurant, and would prefer to make an informed choice.

By selecting a POI search function in the user interface, the driver is presented by system 100 with a list of POIs from which to choose. The list may be presented in a number of ways, depending on implementation. In one embodiment, for example, the user selects POI search, then filters by a restaurants category. User interface module 102 then presents the driver with a list of restaurants within a given distance (which may be radial, driving time, or driving distance, as explained below). For each POI not along the driver's route, user interface module 102 displays two distances: the distance down the route to a point from which the driver would deviate toward the POI (the "along-route distance" to the "route departure point"), and the distance by which the POI is off the route (the "off-route distance"). In our example, the along-route distance is 8.5 miles, and the off-route distance is 1.1 miles. Alternatively, the driver can configure system 100 to display the estimated time off-route caused by the deviation based on information stored in database 106 about the detour, including for example the estimated speed along the off-route portion. In this example, the delay is about two minutes. The driver decides that the two minutes is an acceptable time, and therefore deviates to Cosgrave.

Figure 2:
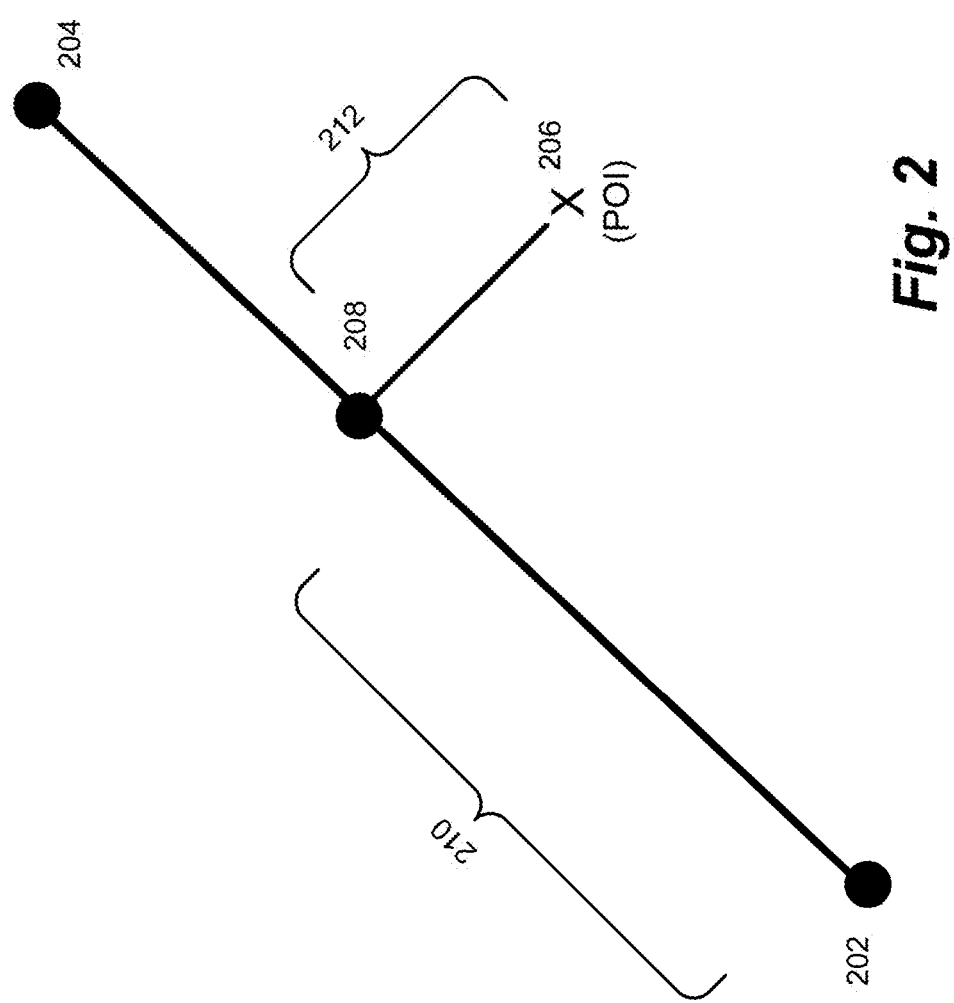
FIG. 2 illustrates a routing from an origin to a destination and a point of interest in accordance with an embodiment of the present invention.

FIG. 2 illustrates the distinction between along-route distance and off-route distance. In FIG. 2, the driver's planned route is from point 202 to point 204. Assume a POI is located at point 206, and to get to the POI the driver has to turn off the route onto another road at point 208. Then the along-route distance 210 is the distance from 202 to 208, and the off-route distance 212 is the distance from point 208 to 206.

In another embodiment, the two distances are, first, the sum of the along-route distance and the off-route distance (the "total distance") and, second, the off-route distance. In yet another embodiment, the two distances are the along-route distance and the total distance.

In conventional navigation systems showing one distance to each POI, the POIs are typically sorted in order of increasing distance. In one embodiment of the present invention, routing engine 104 sorts POIs in order of increasing along-route distance. In other embodiments, routing engine 104 sorts POIs in order of increasing total distance or in order of increasing off-route distance. Note that the distance used as the sort criterion need not be one of the distances displayed by user interface module 102.

Figure 3:
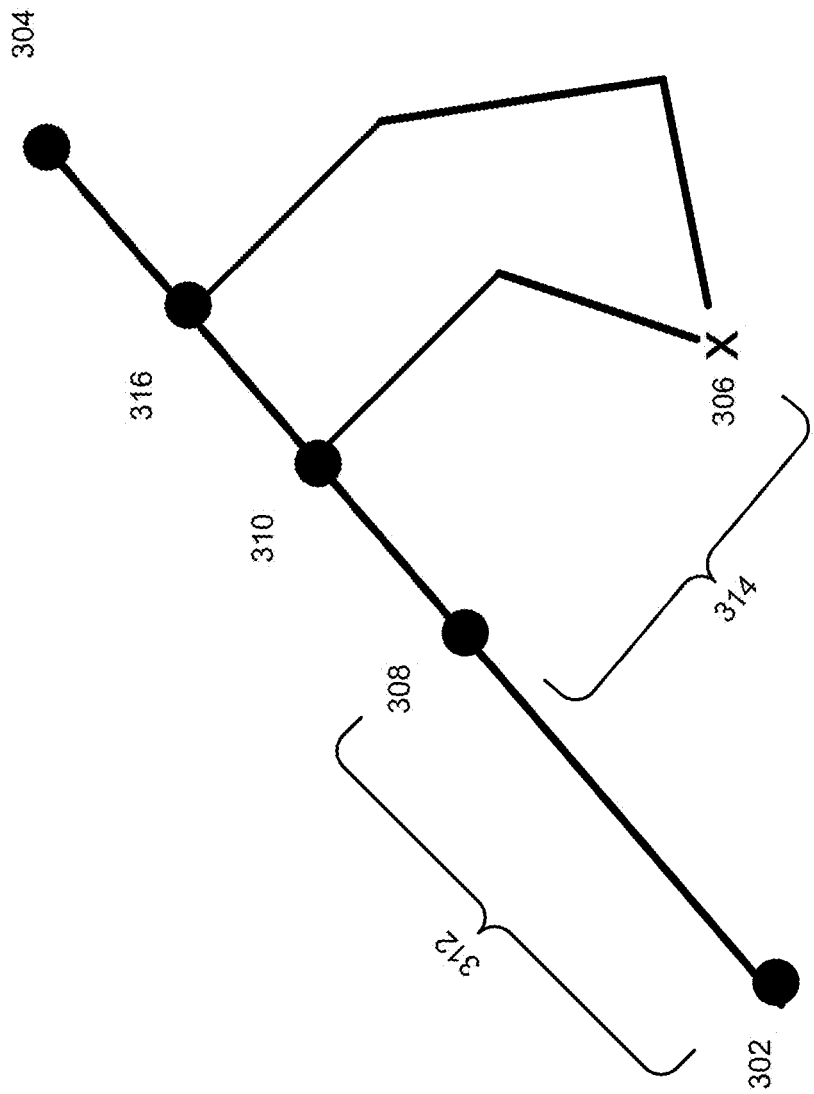
FIG. 3 illustrates multiple routings from an origin to a point of interest in accordance with an embodiment of the present invention.

In one embodiment, and referring to FIG. 3, the along-route and off-route distances are computed purely geometrically. In this embodiment, the route departure point 308 is the point on the route nearest to the POI 306 in Euclidean distance, the off-route distance of the POI is the Euclidean distance 314 from the route departure point 308 to the POI 306, and the along-route distance 312 is the distance, measured along the route, from the current location 302 to the route departure point 308. In another embodiment, the along-route and off-route distances are computed by measuring driving distance. In this embodiment, the route departure point is a point on the route 310 from which the driving distance (rather than the Euclidean distance) to the POI is minimized, the off-route distance is the driving distance along roads, rather than the Euclidean distance, from the route departure point 310 to the POI 306, and the along-route distance is the driving distance along the route from the current location 302 to the route departure point 310. In another embodiment, another metric to be minimized is used instead of driving distance. For example, estimated driving time can be used. In that case, the route departure point is a point 302 on the route from which the estimated driving time to the POI 306 is minimized, the off-route "distance" is the estimated driving time from the route departure point 316 to the POI 306, and the along-route "distance" is the estimated driving time from the current point 302 to the route departure point 316. One of ordinary skill in the art will understand that a wide variety of distance measures can be used.

In some embodiments, the definition of along-route and off-route distance can be varied slightly, in the following way: The route departure point is a point on the route such that the distance along the route to the point plus the distance from the point to the POI is minimized. Here "distance" can be driving distance, estimated driving time, or any other measure of distance to be minimized.

In one embodiment, the search for POIs is limited to a "search distance", that is, a specified distance (in terms of Euclidean distance, driving distance, estimated driving time, or another distance measure) from the route. That is, only POIs within this distance threshold will be displayed to the user. In one embodiment, the user specifies different default search distances for different categories. For example, the driver may be willing to travel 5 miles from the route to reach a gas station, but only 3 miles from the route to reach a restaurant. In one embodiment, user interface module 102 offers the driver, in addition to a list of POIs with their along-route and off-route distances, a "more urgent" and/or a "less urgent" button. As will be understood, as with other parts of the user interface, the "button" may be a real button, a virtual button on a touch-screen, or other suitable type of user interface element. When the "more urgent" button is pressed, the routing engine 104 repeats the search, but with a greater limit for the maximum off-route distance. Routing engine 104 will then tend to find more POIs closer to the current position, but farther off the route. When the "less urgent" button is pressed, routing engine 104 repeats the search, but with a smaller limit for the maximum off-route distance. Routing engine 104 will then tend to find POIs farther from the current position, but closer to the route and therefore more convenient for the driver if the driver is willing to drive farther before reaching the POI.

In one embodiment, common POI searches are made more convenient to the driver by having one or more "I need" buttons accessible to the user with fewer actions (e.g., by pressing fewer buttons) than for general POI searches. In one embodiment, for example, the map display screen of user interface module 102 has an "I need gas" button and an "I need food" button on screen for quick access to searches. In another embodiment, the map display screen has an "I need" button; when the "I need" button is pressed, the screen switches to a simple menu with very common, popular choices, for example, "I need gas", "I need a hotel" and "I need food." In some embodiments, the selection of "I need" buttons on the primary map screen or on the secondary screen is configurable by the user. Thus, one driver who likes coffee can put coffee outlets in the quick "I need" menu, while another driver who doesn't like coffee but does like to buy soft drinks at convenience stores can leave coffee off the quick "I need" menu but include convenience stores.

In some embodiments, routing engine 104 is able to search along a route even when there is no route currently calculated. For example, a driver may not have calculated a route because the driver is so familiar with the route that guidance is not necessary. Still, the driver may want to search for unfamiliar POIs such as gas stations or fast-food outlets even along a familiar route. Routing engine 104 is enabled to perform this kind of search by inferring a likely route. In one embodiment, routing engine 104 assumes that the driver will continue along a route with the same name as far as possible, and, when the road name does not continue, that the driver will continue as nearly straight as possible along roads of the same or greater importance. Routing engine 104 then uses that inferred route as the route along which to search. In such a case, the route may be searched in a conventional manner, or using the techniques described here. In alternative embodiments, routing engine 102 makes the inference more likely by tracking the driver's behavior over multiple trips, and, when the driver is on a road that system 100 recognizes as being used often in the driver's habitual behavior, inferring that the driver will follow the route that he or she most often follows when on the current road. In one embodiment, system 100 stores a history of previous routes (whether pre-programmed or not) taken by the driver. The number of routes in the history is variable according to the preference of the implementer and/or the driver. Route generator 104 then searches previous routes to predict whether the driver is currently following one of them. Route generator 104 then chooses the route with the highest prediction score in order to infer the route and provide POI assistance. In another embodiment, route generator 104 maintains a list of past destinations (as opposed to routes to the destinations), and identifies one or more of the past destinations located in or near the direction of travel. A destination is in or near the direction of travel in one embodiment if the distance to the destination is decreasing. Route generator 104 then selects the previous destination being approached most rapidly and plots a route to it. This route is then the predicted route along which POIs are searched.

Figure 4:
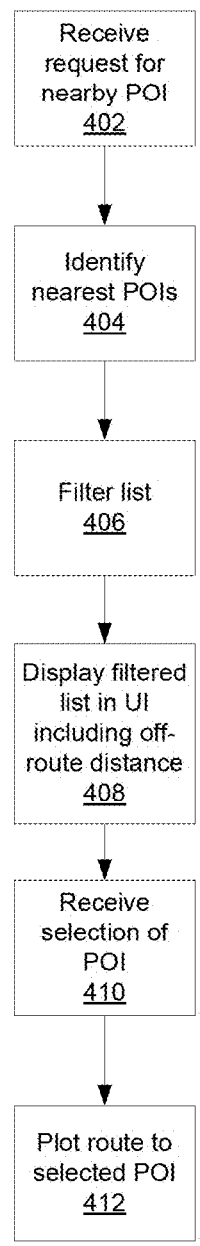
FIG. 4 is a flowchart illustrating a method for providing point-of-interest search along a route in accordance with an embodiment of the present invention.

FIG. 4 is a flowchart illustrating a method for providing point-of-interest search along a route in accordance with an embodiment of the present invention. System 100 receives 402 a request from a driver to display a list of nearby POIs. As noted, this request may be limited to specific categories, or may simply be a request for all known POIs along the route. Also as noted, the request includes a distance or time limitation, or alternatively a default limitation is used. Routing engine 104 performs a search, for example using database 106, and identifies 404 a set of nearby POIs. Routing engine 104 then filters 406 the list according to the distance or time parameters supplied by the driver or by default. User interface module 102 displays 408 the filtered list, along with deviation information including along-route and off-route distances or times, etc., as described above. In one embodiment, for example where the driver does not need directions to the POI, the driver simply proceeds without obtaining further route guidance. Alternatively, the driver requests and the user interface module receives 410 a selection of the POI, and then plots 412 a route to the selected POI.

In various embodiments, the computations described above are performed not on the mobile device but rather on a server. FIG. 5 illustrates a server 504 that is in communication via a communications network 506 with mobile device 502. The driver's particular request for a POI and data about the driver's current location and planned route or direction of travel are sent by mobile device 502 to server 504 via communications network 506. Server 504 determines the list of appropriate results and returns the information to mobile device 102 for display to the user. This allows mobile device 502 to operate with less processing and storage requirements, and also allows for more centralized updating of POI and routing information.

Techniques for searching based on Euclidean distance are known to one of ordinary skill in the art. There are many ways to search in an area such as the area along a route. One indexing scheme is taught in U.S. Pat. No. 5,963,956, incorporated herein by reference in its entirety. In that method, and in many other known indexing methods, it is possible to find records that come within a specified distance of the route. One can retrieve all POIs in such records, and then compute the Euclidean distance to the route and the nearest point on the route, and discard those POIs for which the Euclidean distance to the route exceeds the desired threshold.

When searching is to be based on driving distance, the search can be performed by starting with a search based on Euclidean distance and then adding an additional filtering step. Suppose the threshold distance is d km. If a POI is more than d km from the route in Euclidean distance, it is certainly more than d km from the route in driving distance, since the driving distance must be at least as long as the Euclidean distance, which is essentially a straight line. Thus a first search operation can find those POIs within d km of the route in Euclidean distance. Then the road network can be explored to determine whether the POI is within d km of the route in driving distance.

This secondary filtering operation can be performed in either of two ways. The road network can be explored (using, for example, Dijkstra's algorithm, which is well known to practitioners of the art) outward from the POI until all roads within a distance if d km have been explored or until the route is reached, whichever comes first. If the route is not found within d km of the POI, the POI is more than d km in driving distance from the route and can be rejected. If the route is found within d km of the POI, we know the nearest point on the route and the distance to that nearest point.

Alternatively, the distance to multiple POIs can be checked simultaneously by exploring the road network (using, for example, Dijkstra's algorithm) outward from the route, rather than from the POIs. The exploration can be performed until all roads within d km of the route have been explored. For those POIs which have been reached in the exploration, we know the nearest point on the route and the distance to that point. Those POIs which are not reached in the exploration are not within d km of the route.

In some cases, exploration from the POIs is more efficient, and in others exploration from the route is more efficient. In general, the denser the POIs are in the area around the route, the more efficient it is to perform the search starting at the route. In some embodiments, a decision is made at run time whether to search from the POIs or from the route on the basis of a criterion involving the length of the route, the search radius, and the number of POIs that pass the initial test. In one such embodiment, the test is performed as follows: The assumption is made that the amount of computation expended in searching is roughly proportional to the search area. If the length of the route is I, and the maximum search distance is r, the area to be searched if searching starts at the route is approximately $2Ir+\pi r^2$. If, further, the number of POIs that pass the initial filter is n, the area to be searched if searching starts at the POIs is approximately $n\pi r^2$. This means that the amount of computation expended if starting at the POIs exceeds that expended if starting at the route if and only if $n\pi r^2 > 2Ir+\pi r^2$, i.e., if and only if $(n-1)\pi r > 2I$, i.e., if and only if $n > 1+2I/\pi r$. Accordingly, the search is made from the POIs if $n \leq 1+2I/\pi r$ and from the route if $n > 1+2I/\pi r$. (The case in which n is exactly equal to $1+2 I/\pi r$ is rare, and thus there is little or no difference which decision is made in that case.)

When searching is based on driving time, the search is performed in much the same manner. If driving time is to be estimated, then there is a speed associated with each road element in the map. Routing engine 104 can therefore know the maximum speed associated with any road anywhere in the database. By using that maximum speed, it can determine a maximum distance such that any POIs within the maximum driving time at the maximum speed must also be within the maximum distance. (If the driving-time threshold is t hours, and the maximum speed anywhere in the database is s km/h, then any point within a driving time of t hours will also be within a driving distance of st km, and therefore also within a Euclidean distance of st km.) The first filtering can be performed as described above, and then exploration using driving time can be performed exactly as described above for exploration using driving distance.

As noted above, in some embodiments, the route departure point is chosen so as to minimize not the driving distance from the route to the POI, but rather the total distance from the origin to the route departure point plus the distance to the POI. In such embodiments, the step of finding the route departure point can be performed with a modification to Dijkstra's algorithm. Dijkstra's algorithm as usually implemented maintains a best known distance from the origin to each node in the exploration, as well as an indication of the previous node in the best route from the origin. In this embodiment, Dijkstra's algorithm is modified so that, for each node, both a best known distance from the origin and a distance from the initial route are maintained, as well as an indication of the previous node. For each node in the initial route, the best known distance from the origin is initialized to be the distance from the origin to that node, and the distance from the route is initialized to zero. Then Dijkstra's algorithm is applied in the usual way, but a given node is not explored from if the distance from the route is greater than the limiting distance. POIs not reached in this exploration are beyond the limiting distance. The route that minimizes the distance to each POI from the origin is obtained by following the references to previous nodes from the POI back until the original route is reached.

While the present invention has been described above in particular detail with respect to a limited number of embodiments, other embodiments are possible as well. The particular naming of the components and their programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, as illustrated for example by the description of FIG. 4, and functions performed by multiple components may instead performed by a single component. For example, the particular functions of the routing engine 104 may be provided in many or one module.

The operations described above, although described functionally or logically, may be implemented by computer programs stored on one or more computer readable media and executed by a processor. Computer readable storage media include, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

Throughout the description, discussions using terms such as "processing" or "computing" or "calculating" or "determining" or "displaying" or the like, refer to the action and processes of a particular computer system, or similar electronic computing device, that manipulates and transforms data representing or modeling physical characteristics, and which is represented as physical (electronic) quantities within the computer system memories or registers or other such information storage, transmission or display devices.

The algorithms and displays presented above are not inherently related to any particular computer or other apparatus. Various general-purpose systems may also be modified by using the teachings herein, or it may prove convenient to construct more specialized apparatus to perform the described method steps. The required structure for a variety of these systems will appear from the description above. In addition, the present invention is not described with reference to any particular programming language, any suitable one of which may be selected by the implementer.

Finally, it should be noted that the language used in the specification has been principally selected for readability and instructional purposes, and may not have been selected to delineate or circumscribe the inventive subject matter.

Accordingly, the disclosure of the present invention is intended to be illustrative, but not limiting, of the scope of the invention.

What is claimed is:

1. A method for providing navigation information to a driver, the method comprising:
   determining, by a computing system, a route of travel for a driver of a vehicle from a first location to a second location;
   receiving, from the driver via a user interface, a selection of a category of points of interest from a driver;
   responsive to the selection, determining, by the computing system, a location for the driver to travel to that corresponds to the category and is located within a specified first threshold distance from the determined route of travel, the first threshold distance selected based on the category and a level of urgency for traveling to locations corresponding to the category;
   determining, by the computing system, a route departure point from which to deviate from the determined route of travel to travel to the determined location;
   determining, by the computing system, an estimated distance for the driver to travel from a current location of the driver to the route departure point and an estimated distance for the driver to travel from the route departure point to the determined location; and
   causing, by the computing system, a computing device of the driver to present, in the user interface, (i) information corresponding to the determined location, and (ii) information corresponding to the determined estimated distances.

2. The method of claim 1 wherein the first location corresponds to the current location of the driver and wherein determining the location includes searching a database for a set of locations based on the current location.

3. The method of claim 1 wherein the determined location is a first location, and wherein the first location is further located within a second threshold distance from the determined route of travel.

4. The method of claim 3 further comprising:
   receiving a request from the driver indicating a preference for locations closer to the current location;
   increasing the first threshold distance;
   identifying a third location located within the increased first threshold distance and the second threshold distance; and
   causing, by the computing system, the computing device of the driver to present, in the user interface, (i) information corresponding to the identified third location, and (ii) information corresponding to an estimated off-route distance to the third location.

5. The method of claim 4 wherein the second threshold distance is a radial distance.

6. The method of claim 4 wherein the second threshold distance is a driving distance.

7. A computer program product for providing navigation information to a driver, the computer program product stored on a non-transitory computer readable medium and including executable instructions for causing one or more processors to carry out steps comprising:
   determining a route of travel for a driver of a vehicle from a first location to a second location;
   receiving, from the driver via a user interface, a selection of a category of points of interest from a driver;
   responsive to the selection, determining, by the computing system, a location for the driver to travel to that corresponds to the category and is located within a specified first threshold distance from the determined route of travel, the first threshold distance selected based on the category and a level of urgency for traveling to locations corresponding to the category;
   determining a route departure point from which to deviate from the determined route of travel to travel to the determined location;
   determining an estimated travel time for the driver to travel from a current location of the driver to the route departure point and an estimated travel time for the driver to travel from the route departure point to the determined location; and
   causing the computing device of the driver to present, in the user interface, (i) information corresponding to the determined location, and (ii) information corresponding to the determined estimated travel times.

8. The computer program product of claim 7 wherein the first location corresponds to the current location of the driver and wherein determining the location includes searching a database for a set of locations based on the current location.

9. The computer program product of claim 7 wherein the determined location is a first location, and wherein the first location is further located within a second estimated travel time from the determined route of travel.

10. The computer program product of claim 9 further comprising:
    receiving a request from the driver indicating a preference for locations having a shorter estimated travel time off of the route of travel;
    increasing the first threshold distance;
    identifying a third location located within the increased first threshold distance and the second threshold distance; and
    causing, by the computing system, the computing device of the driver to present, in the user interface, (i) information corresponding to the identified third location, and (ii) information corresponding to an estimated off-route travel time to the third location.

11. A system for providing navigation information to a driver, the system comprising:
    a processor;
    a global navigation satellite system radio, adapted to determine a current location of a user;
    a routing engine, coupled to the global navigation satellite system and executed by the processor, adapted to:
       determine a route of travel for a driver of a vehicle from a first location to a second location;
       receive, from the driver via a user interface, a selection of a category of points of interest from a driver;
       responsive to the selection, determine, by the computing system, a location for the driver to travel to that corresponds to the category and is located within a specified first threshold distance from the determined route of travel, the first threshold distance selected based on the category and a level of urgency for traveling to locations corresponding to the category;
       determine a route departure point from which to deviate from the determined route of travel to travel to the determined location;
       determine an estimated distance for the driver to travel from the current location of the user to the route departure point and an estimated distance for the user to travel from the route departure point to the determined location; and present, in the user interface, (i) information corresponding to the determined location, and (ii) information corresponding to the determined estimated distances.

12. The system of claim 11 wherein the first location corresponds to the current location of the user and wherein determining the location includes searching a database for a set of locations based on the current location.

13. The method of claim 1 wherein the selection is received in response to the driver manipulating a graphical interface element associated with the category on the user interface.

14. The computer program product of claim 7 wherein the selection is received in response to the driver manipulating a graphical interface element associated with the category on the user interface.

15. The system of claim 11 wherein the selection is received in response to the driver manipulating a graphical interface element associated with the category on the user interface.

* * * * *